United States Patent
Mizushima et al.

(10) Patent No.: US 10,355,567 B2
(45) Date of Patent: Jul. 16, 2019

(54) JOINING METHOD FOR COIL ENDS OF SEGMENT COILS FOR STATOR

(71) Applicant: TOYOTA JIDOSHA KABUSHIKI KAISHA, Toyota-shi, Aichi-ken (JP)

(72) Inventors: Daisuke Mizushima, Toyota (JP); Yasuyuki Hirao, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 15/295,155

(22) Filed: Oct. 17, 2016

(65) Prior Publication Data
US 2017/0126106 A1     May 4, 2017

(30) Foreign Application Priority Data
Oct. 29, 2015 (JP) .................................. 2015-212685

(51) Int. Cl.
*H02K 15/085* (2006.01)
*H02K 3/12* (2006.01)
*H02K 3/28* (2006.01)
*H02K 15/00* (2006.01)

(52) U.S. Cl.
CPC ............. *H02K 15/085* (2013.01); *H02K 3/12* (2013.01); *H02K 3/28* (2013.01); *H02K 15/0081* (2013.01)

(58) Field of Classification Search
CPC ............ H02K 3/04; H02K 3/14; H02K 15/04; H02K 3/12; H02K 3/28; H02K 15/0081; H02K 15/085
See application file for complete search history.

(56) References Cited

U.S. PATENT DOCUMENTS

| | | | | |
|---|---|---|---|---|
| 6,339,871 | B1 * | 1/2002 | Maesoba ............ | H02K 15/0428 29/596 |
| 6,885,123 | B2 * | 4/2005 | Gorohata ................. | H02K 3/12 310/201 |
| 6,903,478 | B2 * | 6/2005 | Dobashi ................... | H02K 3/12 310/179 |
| 6,903,479 | B2 * | 6/2005 | Kato .................. | H02K 15/0037 310/201 |

(Continued)

FOREIGN PATENT DOCUMENTS

JP     2001069731 A  *  3/2001
JP     2004328861 A     11/2004

(Continued)

*Primary Examiner* — Carl J Arbes
(74) *Attorney, Agent, or Firm* — Oliff PLC

(57) ABSTRACT

A joining method for coil ends includes: pressing a pair of tapered portions such that a pair of first pressing jigs provided with a pair of detent portions is brought closer to the coil ends along an axial direction of the stator core, the pair of detent portions being fitted to the tapered portions; fixing axial positions of the pair of tapered portions such that the pair of detent portions is fitted to the pair of tapered portions so that the pair of tapered portions is sandwiched in a circumferential direction; fixing radial positions of the pair of tapered portions such that the pair of tapered portions is sandwiched by a pair of second pressing jigs so that the tapered portions of the pair of tapered portions make contact with each other; and welding a contacting portion where the tapered portions make contact with each other.

4 Claims, 13 Drawing Sheets

(56) References Cited

U.S. PATENT DOCUMENTS

| | | | | |
|---|---|---|---|---|
| 6,910,257 B1* | 6/2005 | Gorohata | ........... | H02K 15/0428 |
| | | | | 242/599.1 |
| 6,971,153 B2* | 12/2005 | Tokizawa | ........... | H02K 15/0414 |
| | | | | 29/596 |
| 7,210,215 B2* | 5/2007 | Kato | .................. | H02K 15/0037 |
| | | | | 29/596 |

FOREIGN PATENT DOCUMENTS

| JP | 2006304507 A | 11/2006 |
|---|---|---|
| JP | 2014107876 A | 6/2014 |
| JP | 2014161176 A | 9/2014 |

\* cited by examiner

JOINING METHOD FOR COIL ENDS OF SEGMENT COILS FOR STATOR

INCORPORATION BY REFERENCE

The disclosure of Japanese Patent Application No. 2015-212685 filed on Oct. 29, 2015 including the specification, drawings and abstract is incorporated herein by reference in its entirety.

BACKGROUND

1. Technical Field

The present disclosure relates to a joining method for coil ends of segment coils used for a stator, and a joining apparatus.

2. Description of Related Art

When a stator of a motor is manufactured, segment coils that form a coil by being joined together are used. A joining method for end parts of segment coils is described in Japanese Patent Application Publication No. 2006-304507 (JP 2006-304507 A). The segment coil is configured such that a distal end is formed in a tapered shape. The segment coils are assembled in order from an inner side to an outer side in a radial direction of a stator core, and the segment coils of a pair of segment coils adjacent to each other in the radial direction are tilted in opposite directions to each other along a circumferential direction of the stator core. By this structure, a height of the coil ends is shortened. Then, a conductive adhesive is applied to to-be-joined parts of distal ends of a pair of segment coils as a joining target. After that, a plurality of wedge-shaped plate bodies is inserted into respective gaps of the distal ends of the pair of segment coils along the radial direction of the stator core, so that the to-be-joined parts are fixed at predetermined positions along the radial direction. Subsequently, a state where the plate bodies are pressurized at a predetermined pressure is maintained for a predetermined time, so as to cure the conductive adhesive, thereby joining segment coil ends to each other.

SUMMARY

The joining method for the end parts of the segment coils, as described in JP 2006-304507 A, uses a conductive adhesive, and does not describe anything about a joining method by welding. Further, in this method, distal ends of a pair of segment coils can be positioned along the radial direction of the stator core, but positioning along an axial direction and a circumferential direction of the stator core is not described. Accordingly, in a case where this method is to be used for welding of distal ends of a pair of segment coils, such a problem occurs that the positioning along the axial direction and the circumferential direction of the stator core cannot be performed accurately.

The embodiments provide a coil end joining method and a joining apparatus, each of which is able to accurately perform positioning of coil ends of segment coils in the manufacture of a stator core.

A first aspect relates to a joining method for coil ends of segment coils for a stator, and the joining method includes: assembling segment coils formed in a predetermined shape into slots of a stator core sequentially from an inner side toward an outer side in a radial direction of the stator core; tilting coil ends of a pair of the segment coils adjacent to each other in the radial direction in the stator core so that the coil ends are tilted toward mutually opposite directions in a circumferential direction of the stator core, the coil ends each having a tapered portion having a distal end with a tapered shape and having a chamfer facing toward the stator core; pressing a pair of the tapered portions adjacent to each other in the radial direction in a state where the coil ends are tilted, such that a pair of first pressing jigs provided with a pair of detent portions is brought closer to the coil ends along an axial direction of the stator core, the pair of detent portions being fitted to the pair of tapered portions; fixing axial positions of the pair of the tapered portions such that a first one of the pair of detent portions is fitted to the chamfer of a first one of the pair of tapered portions and a second one of the pair of detent portions is fitted to the chamfer of a second one of the pair of the tapered portions; fixing radial positions of the pair of the tapered portions such that the pair of the tapered portions is sandwiched by a pair of second pressing jigs from the inner side and the outer side in the radial direction so that the tapered portions of the pair of tapered portions make contact with each other; and welding a contacting portion where the tapered portions of the pair of the tapered portions make contact with each other.

According to the first aspect, when the tapered portions of the coil ends in the stator core are pressed by the first pressing jigs, so that the pair of detent portions of the first pressing jigs is fitted to the pair of the tapered portions, it is possible to fix positions of the tapered portions along the axial direction of the stator core at predetermined positions. Further, by sandwiching the pair of the tapered portions along the radial direction of the stator core by the pair of second pressing jigs, it is possible to fix the radial positions of the tapered portions at predetermined positions.

The first aspect may further include fixing circumferential positions of the pair of the tapered portions such that, in a state where the first one of the pair of detent portions is fitted to the chamfer of the first one of the pair of the tapered portions and the second one of the pair of detent portions is fitted to the chamfer of the second one of the pair of the tapered portions, the pair of detent portions are moved so as to approach each other along the circumferential direction.

According to the above configuration, when the detent portions of the pair of detent portions are moved so as to approach each other along the circumferential direction of the stator core so that the pair of the tapered portions are sandwiched along the circumferential direction of the stator core, it is possible to fix positions of the tapered portions along the circumferential direction of the stator core at predetermined positions. In this state, the tapered portions of the pair of the tapered portions are fixed to the predetermined positions in terms of the axial direction by the pair of detent portions, and also fixed along the radial direction of the stator core by the pair of second pressing jigs. That is, according to the above configuration, the tapered portions of the coil ends can be fixed at the predetermined positions in terms of the axial direction, the radial direction, and the circumferential direction of the stator core.

The detent portions may each have a fitting surface formed along the circumferential direction and inclined to a direction approaching the stator core in the axial direction; and when the detent portions of the pair of detent portions are moved so as to approach each other along the circumferential direction, the circumferential positions of the pair of the tapered portions may be fixed such that the respective chamfers of the pair of the tapered portions are fitted to the respective fitting surfaces.

According to the above configuration, since the fitting surfaces are formed in the detent portions of the first pressing jigs, when the first pressing jigs are moved in the circumferential direction of the stator core, it is possible to surely fit the tapered portions of the coil ends to the detent portions. The method makes it possible to surely fix the tapered portions at the predetermined positions in terms of the circumferential direction and the axial direction of the stator core simultaneously.

Each of the first pressing jigs may have a penetration groove provided at a position corresponding to a position of the contacting portion along the axial direction, the penetration groove being provided so as to weld the contacting portion, and laser welding may be performed on the contacting portion from the axial direction through the penetration groove.

According to the above configuration, the contacting portion of the pair of the tapered portions fixed at the predetermined positions by the second pressing jigs and the first pressing jigs can be welded from the axial direction of the stator core through the penetration grooves formed in the first pressing jigs. By applying a laser beam through the penetration grooves, it is possible to weld the contacting portion without affecting the other part except for the pair of tapered portions as a welding target.

A second aspect relates to a joining apparatus for coil ends of segment coils for a stator, and the joining apparatus includes: a pair of first pressing jigs each having a flat surface, a detent portion projecting from the flat surface and having an inclined surface inclined relative to the flat surface at less than 90°, and a penetration groove penetrating the first pressing jigs in a generally perpendicular direction with respect to the flat surface; and a pair of L-shaped second pressing jigs.

According to the embodiments, it is possible to accurately perform positioning of coil ends of segment coils at a time when the coil ends of the segment coils are joined in manufacture of a stator core.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The following describes an embodiment of a coil end joining apparatus for segment coils for a stator and a joining method thereof with reference to the drawings.

Figure 1:
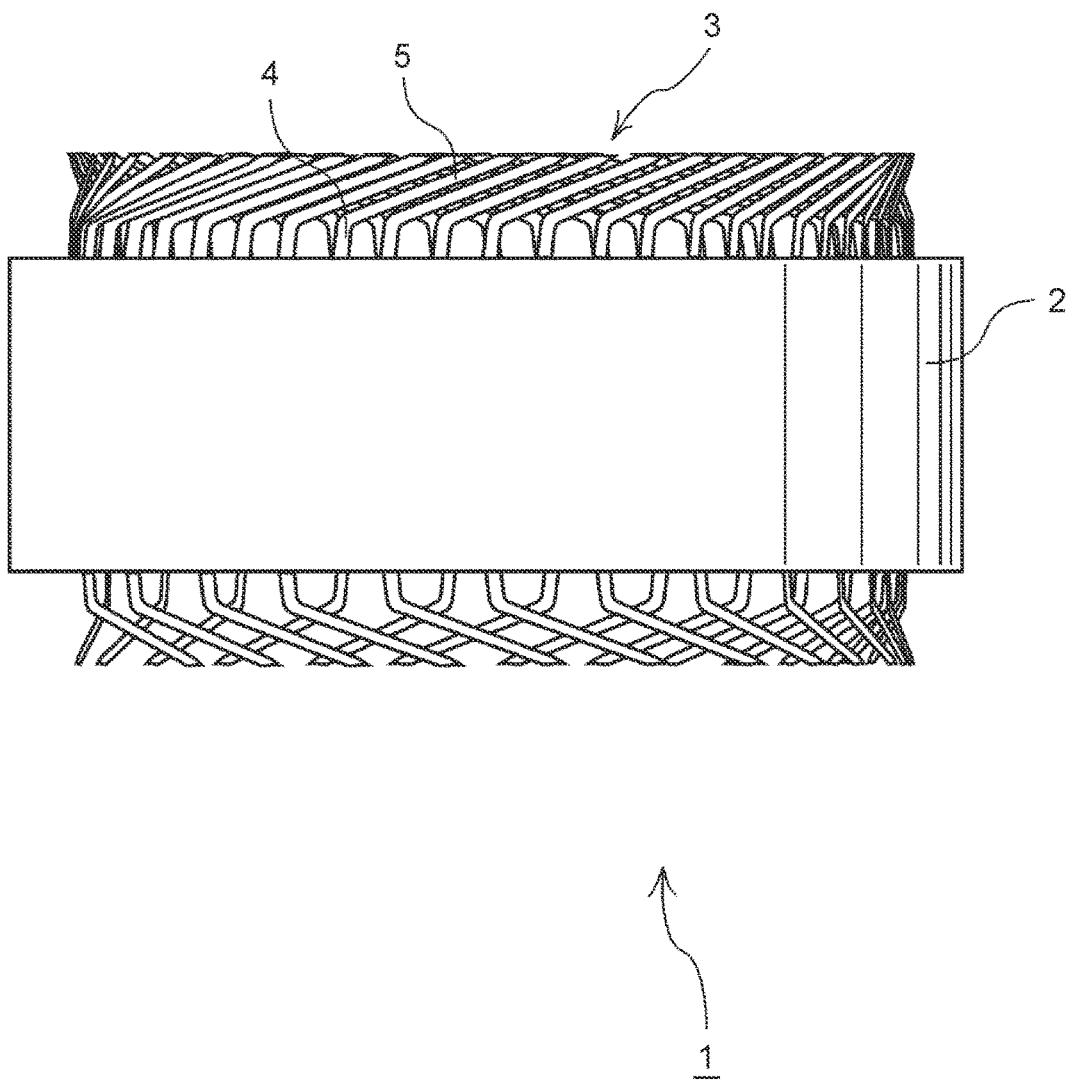
FIG. 1 is a view illustrating a stator core as a manufacture object of one embodiment.
Figure 2:
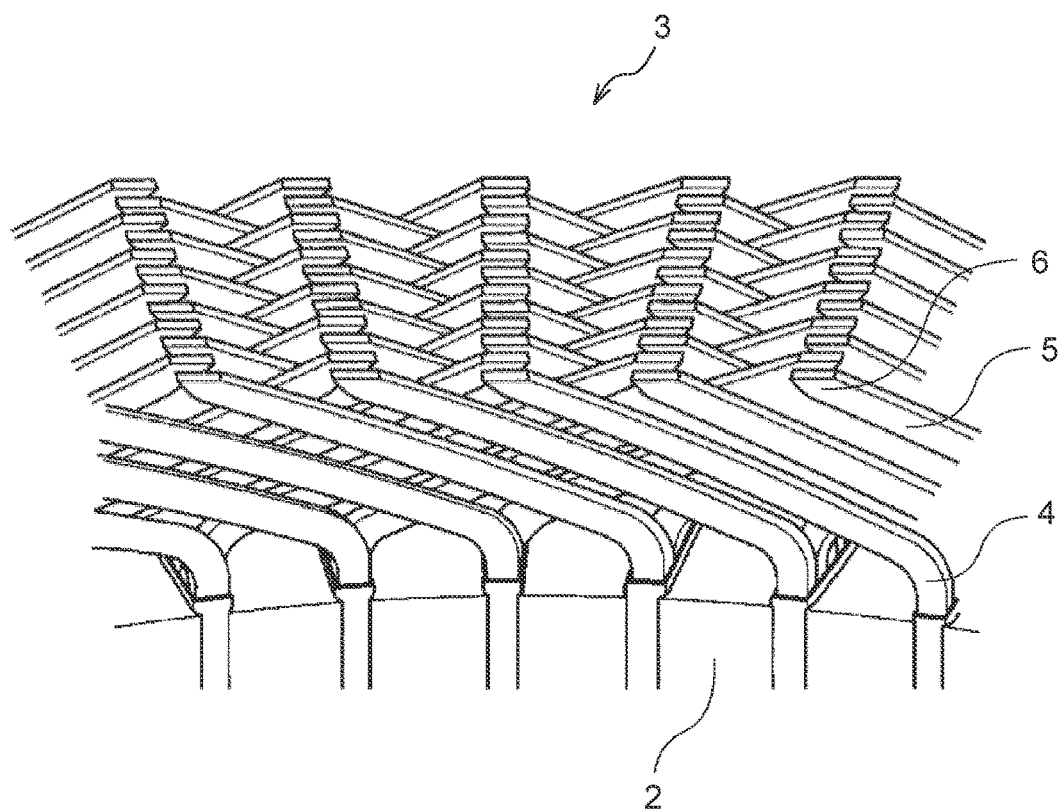
FIG. 2 is a view illustrating to-be-joined parts of segment coils.

As illustrated in FIGS. 1 and 2, a stator 1 for a motor includes a toric stator core 2, and a plurality of segment coils 4 to form a coil 3 inside the stator core 2. The stator core 2 is formed such that thin toric steel plates are laminated. Inside the stator core 2, a plurality of segment coils 4 formed in a U-shape is arranged along a circumferential direction of the stator core 2. The plurality of segment coils 4 is laminated sequentially from an inner side toward an outer side along a radial direction of the stator core 2. The coil 3 is formed by the plurality of segment coils 4 assembled as such.

Figure 3:
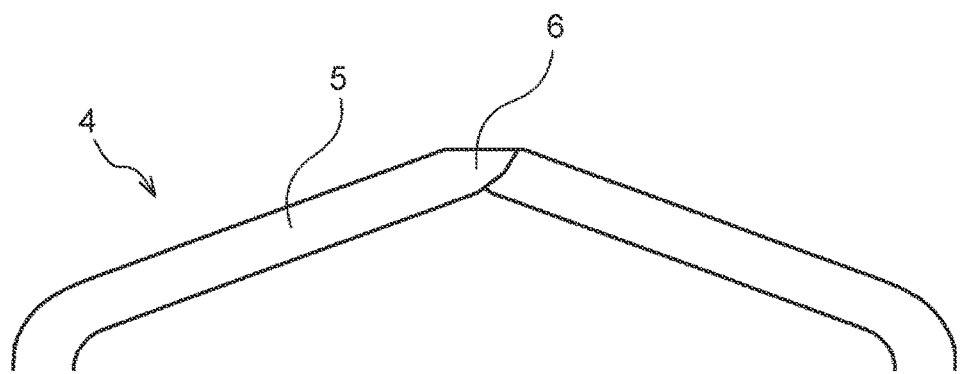
FIG. 3 is a view illustrating to-be-joined parts of segment coils.

As illustrated in FIG. 3, a pair of coil ends 5 of a pair of segment coils 4 is adjacent to each other in the radial direction of the stator core 2. The coil ends of the pair of coil ends 5 are tilted in opposite directions to each other along the circumferential direction of the stator core 2. A distal end of coil end 5 has a tapered portion 6 formed in a tapered shape. The tapered portion 6 is formed to have such a shape that the coil end 5 is cut parallel to the radial direction of the stator core 2 in a state where the coil end 5 is tilted. By this structure, a height of the coil end 5 along an axial direction of the stator core 2 is shortened. Distal ends of the pair of coil ends 5 adjacent to each other are welded so as to be electrically connected.

Figure 4:
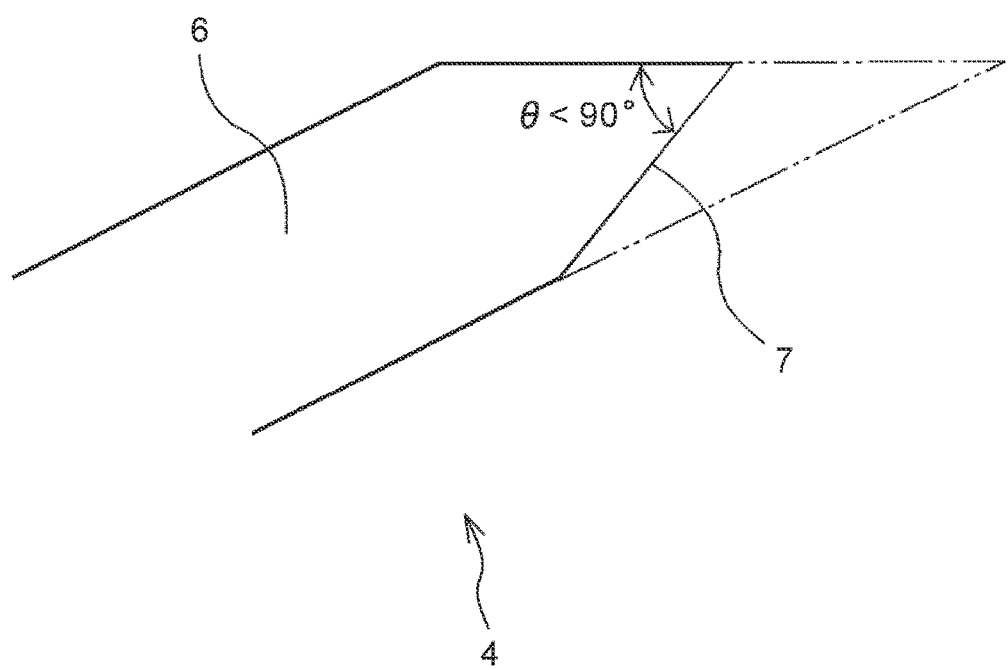
FIG. 4 is a view illustrating a distal end of a coil end of a segment coil.
Figure 5:
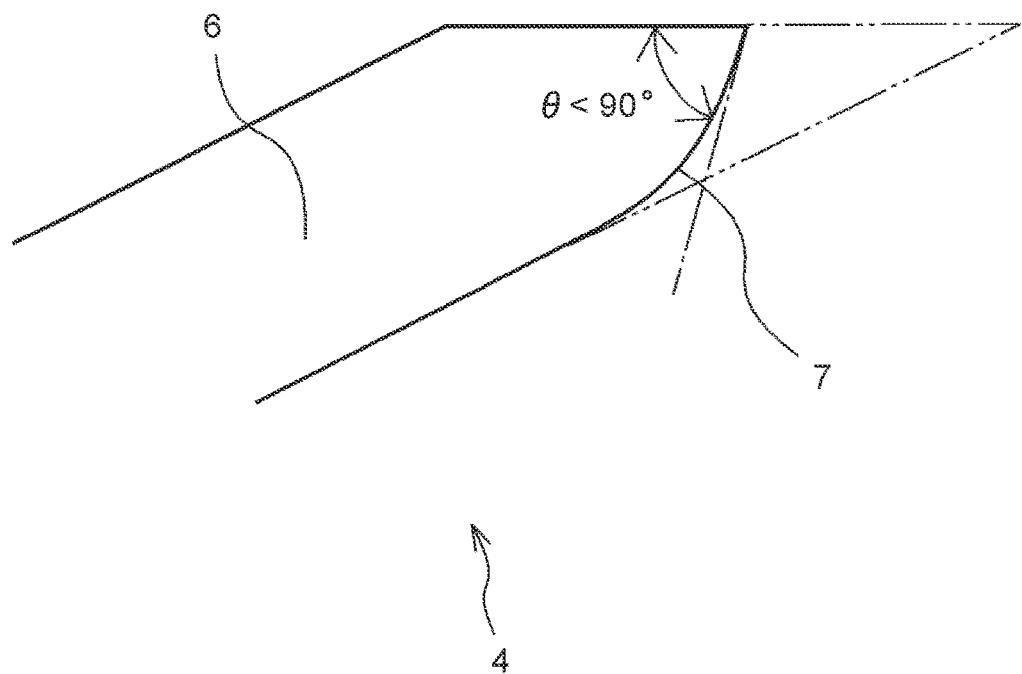
FIG. 5 is a view illustrating a modification of the distal end of the coil end of the segment coil.

As illustrated in FIG. 4, a chamfer 7 is formed in a distal end of the tapered portion 6 so that the distal end rises sharply in the axial direction of the stator core 2. Due to the chamfer 7, an angle of the distal end of the tapered portion 6 is formed to be larger than it would be without the chamfer 7. An angle θ of the distal end of the tapered portion 6 is less than 90°. As illustrated in FIG. 5, the chamfer 7 may be formed in an R-shape (a rounded shape) so as to project toward a stator-core-2 side. For example, the tapered portion 6 is formed as follows. A part of a belt-shaped lead wire extended in a linear shape is bent such that an axis of the lead wire deviates in parallel in a longitudinal direction of a section of the belt shape, so as to form a bending portion. The bending portion is formed by molding the lead wire with a die, for example. After that, the bending portion is pressed from both sides in a short direction of the section of the belt shape. Then, the bending portion is cut diagonally with respect to the axis of the lead wire from the longitudinal direction of the section of the belt shape of the bending portion, thereby forming the tapered portion 6 having the chamfer 7.

Distal ends of a pair of tapered portions 6 adjacent to each other in the radial direction of the stator core 2 are welded together. In the circumferential direction of the stator core 2, welded portions (parts where an insulation coating is removed) of respective pairs of tapered portions 6 are placed at intervals. By forming the distal ends of the tapered portions 6 in the aforementioned shape, it is possible to increase an insulation distance between the welded portions adjacent to each other in the circumferential direction of the stator core 2. By increasing the insulation distance, it is possible to reduce an eddy current loss of the segment coil 4. The following describes a coil end joining apparatus 50 used for a pair of coil ends 5 adjacent to each other in the radial direction and a joining method thereof.

Figure 6:
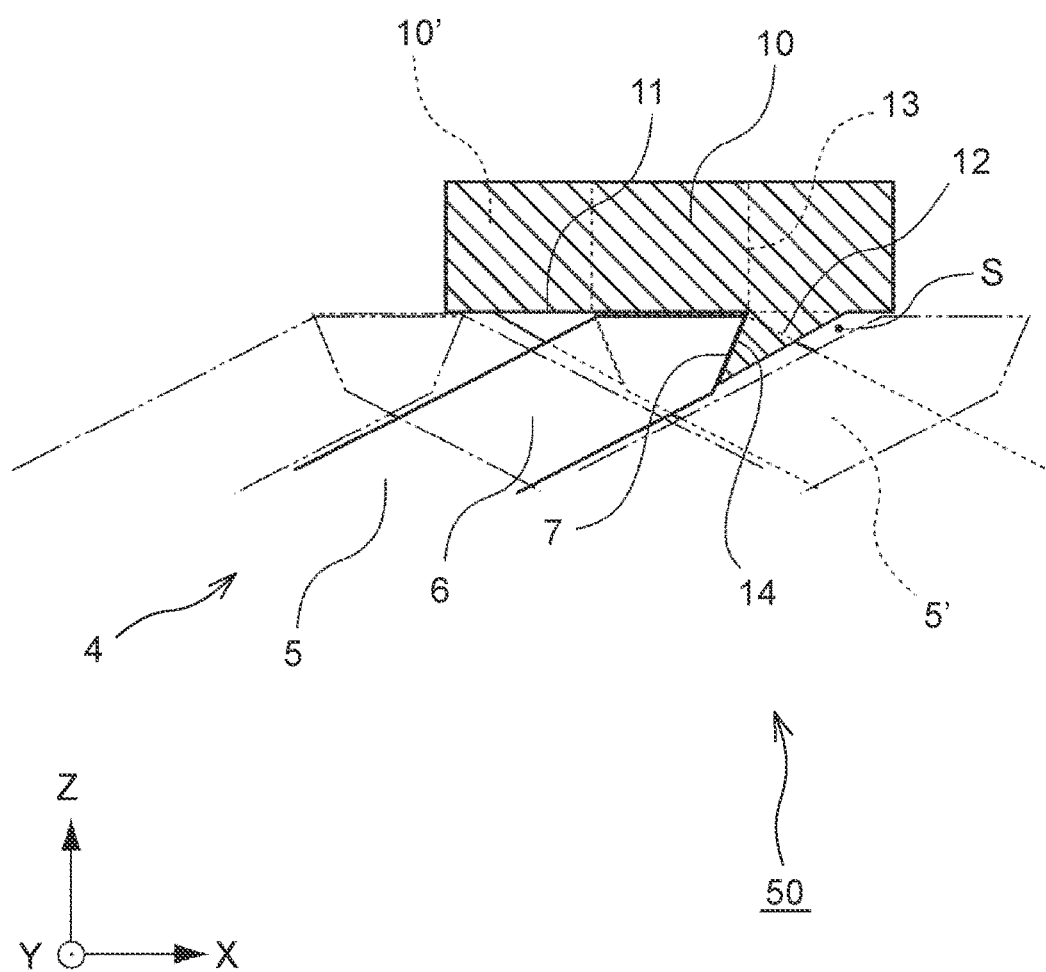
FIG. 6 is a sectional view illustrating a configuration of a coil end joining apparatus according to one embodiment.
Figure 7:
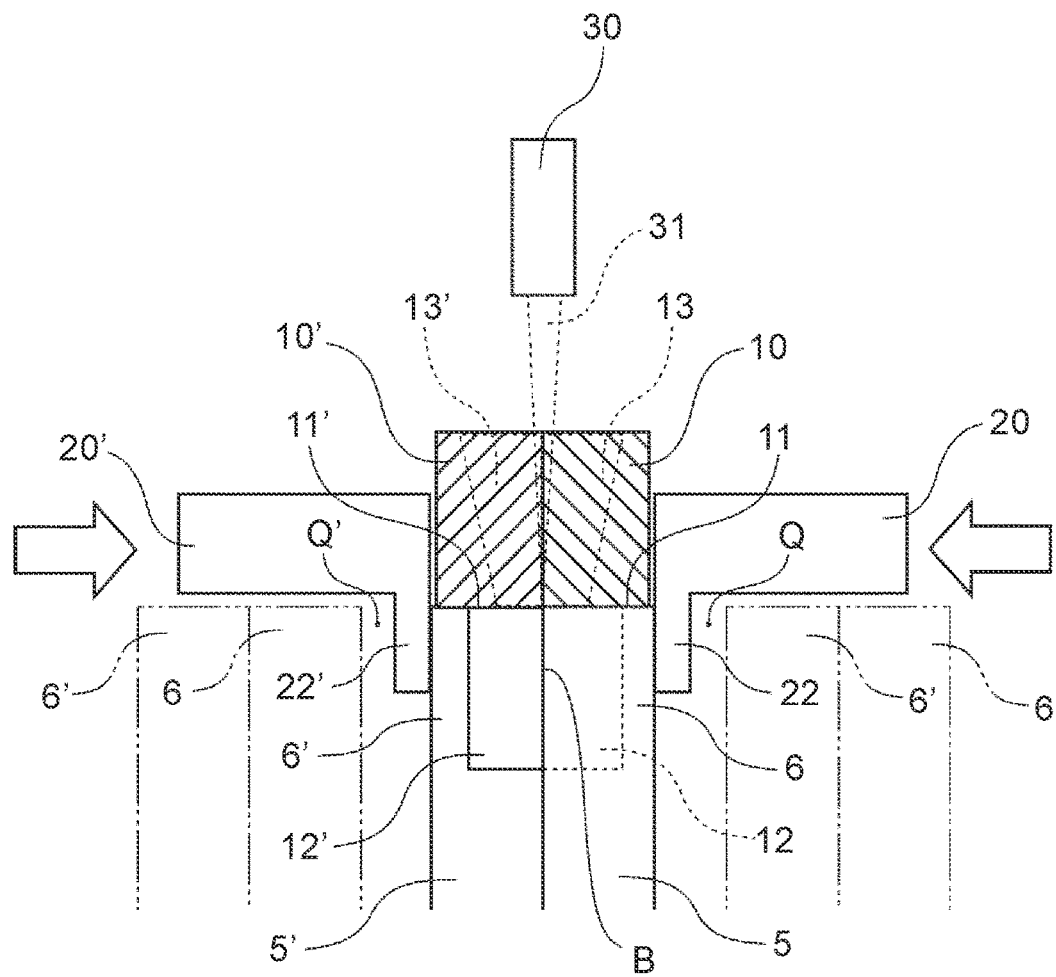
FIG. 7 is a sectional view illustrating the configuration of the coil end joining apparatus, when viewed from another direction.
Figure 8:
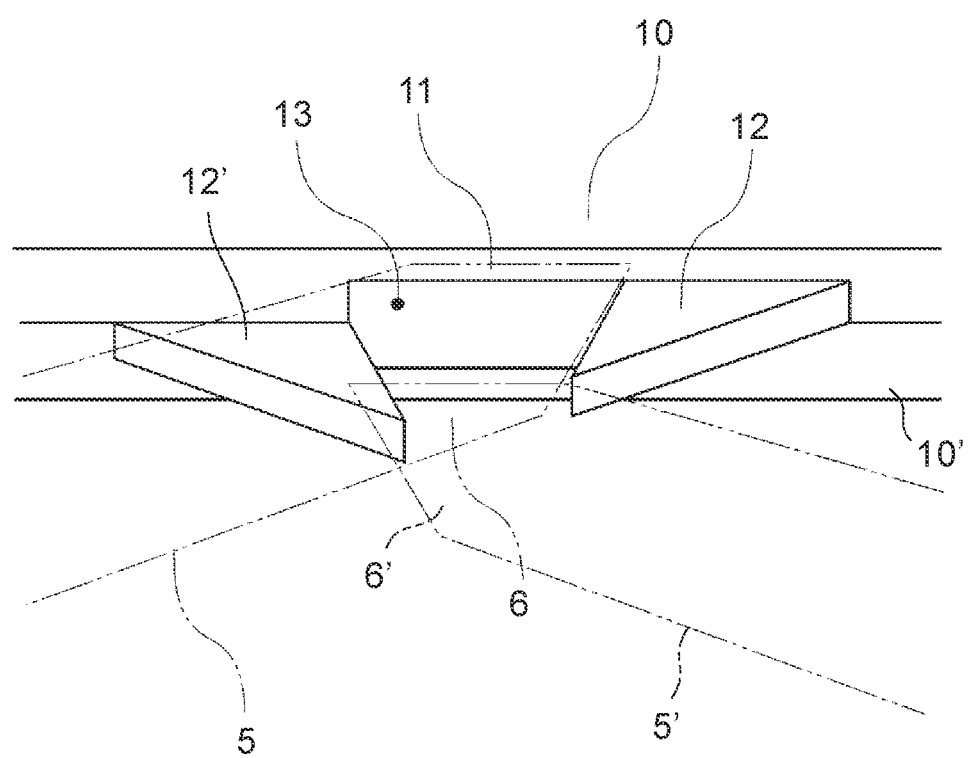
FIG. 8 is a perspective view illustrating a detent portion of a first pressing jig.

As illustrated in FIGS. 6 to 8, the coil end joining apparatus 50 includes: a pair of first pressing jigs 10, 10' configured to position coil ends 5 in the axial direction and the circumferential direction of the stator core 2; and a pair of second pressing jigs 20, 20' configured to position the coil ends 5 in the radial direction of the stator core 2.

A coil end 5' is adjacent to the coil end 5 in the radial direction (Y-direction) of the stator core 2 so that a distal end of the coil end 5 and a distal end of the coil end 5' are directed toward opposite directions. The first pressing jig 10 is fitted to a tapered portion 6 of the coil end 5. The first pressing jig 10 is configured to position the tapered portion 6 along the axial direction (Z-direction) and the circumferential direction (X-direction) of the stator core 2. A flat portion 11 that is flat along the X-direction so as to press the tapered portion 6 is formed in a bottom of the first pressing jig 10.

A detent portion 12 formed so as to project downward (−Z-direction) is formed in the flat portion 11. A fitting surface 14 inclined toward a moving direction (−X-direction) where the detent portion 12 moves is formed in the detent portion 12. The fitting surface 14 is formed along the circumferential direction (X-direction) and is inclined in a direction approaching the stator core 2 in the axial direction (Z-direction). The detent portion 12 is formed so as to enter a space S formed between the chamfer 7 of the coil end 5 and its adjacent coil end 5 in the X-direction so as to prevent interference with the adjacent coil end 5 in the X-direction. The tapered portion 6 is fitted to the first pressing jig 10 due to the flat portion 11 and the detent portion 12.

The first pressing jig 10' configured to press the coil end 5' is adjacent to the first pressing jig 10 in a −Y-direction. The coil end 5' and the first pressing jig 10' have the same configurations and shapes as the coil end 5 and the first pressing jig 10, respectively, and are placed in rotation symmetry to a Z-axis. Accordingly, in the following description, the coil end 5' and the first pressing jig 10' have the same configurations described above. A penetration groove 13 penetrating along the Z-axis direction is formed in the first pressing jig 10. The penetration groove 13 is provided in the first pressing jig 10 in a penetrating manner at a position corresponding to a position of the tapered portion 6 along the Z-axis direction. One through-hole to weld the coil ends 5 is formed by the penetration groove 13 and a penetration groove 13'.

Figure 9:
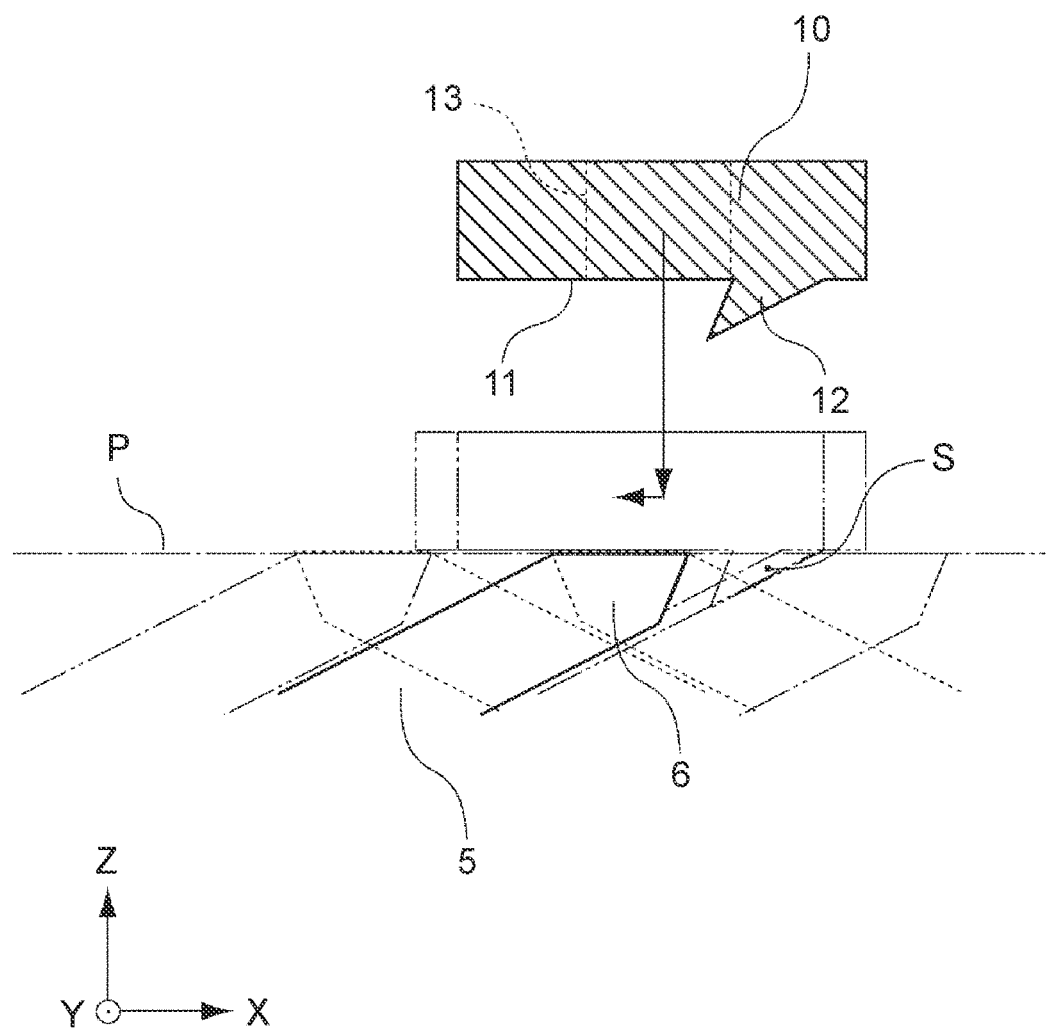
FIG. 9 is a view illustrating a joining method for coil ends by use of the coil end joining apparatus.
Figure 10:
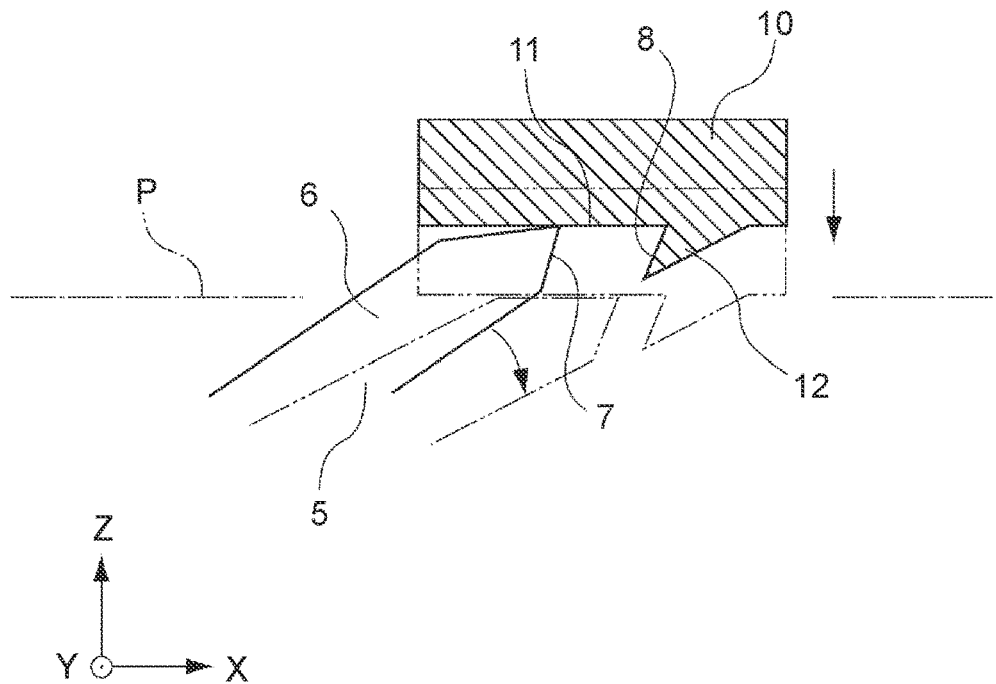
FIG. 10 is a view illustrating positioning of the coil end by the first pressing jig.
Figure 11:
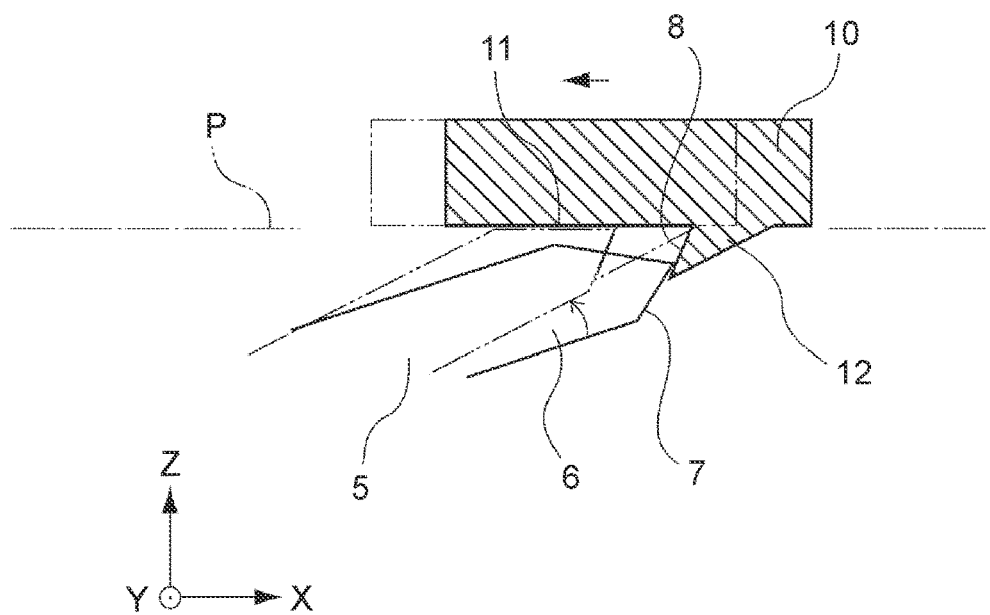
FIG. 11 is a view illustrating positioning of the coil end by the first pressing jig.
Figure 12:
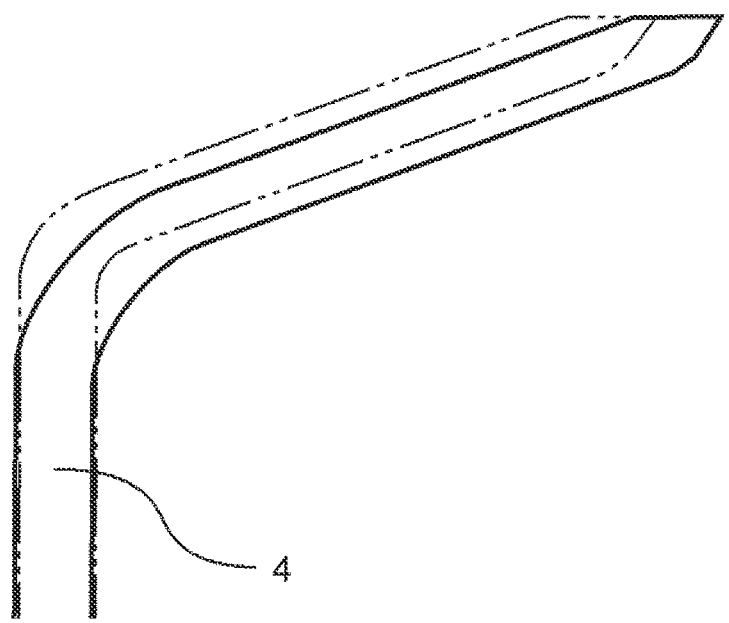
FIG. 12 is a view illustrating a deviation of bending of the coil end.
Figure 12:
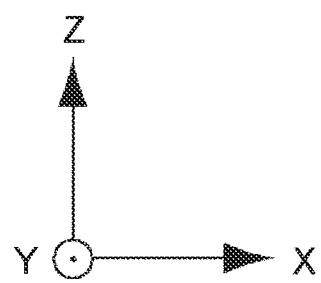
Figure 13:
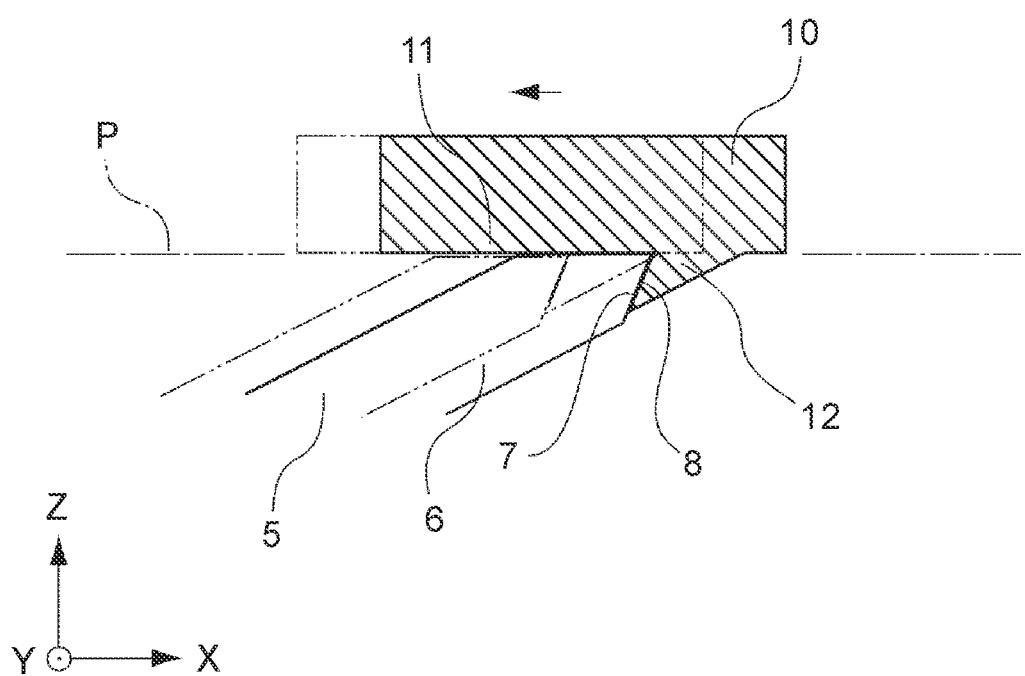
FIG. 13 is a view illustrating positioning of the coil end by the first pressing jig.

As illustrated in FIG. 9, the first pressing jig 10 moves so as to approach the coil end 5 in the −Z-direction along the Z-axis, and stops at a reference position P while applying a force in the −Z-direction. At this time, the detent portion 12 enters the space S so as not to make contact with the chamfer 7. By this structure, an upper end of the tapered portion 6 of the coil end 5 abuts with the flat portion 11, and a force is applied to the coil end 5 in the −Z-direction by the first pressing jig 10. At this time, the upper end of the tapered portion 6 is placed at the reference position P, and a position of the tapered portion 6 in the Z-axis direction is fixed.

Similarly, a position of a tapered portion 6' of the coil end 5' in the Z-axis direction is also fixed by the first pressing jig 10'. That is, a pair of tapered portions 6, 6' is pressed in the axial direction of the stator core 2 by the pair of first pressing jigs 10, 10', so that the positions of the pair of tapered portions 6, 6' in the axial direction of the stator core 2 are fixed.

After that, the first pressing jig 10 moves in the −X-direction, and the detent portion 12 abuts with the chamfer 7. By this process, the tapered portion 6 is fitted to the first pressing jig 10, so that a position of the tapered portion 6 in the X-axis direction is fixed. Similarly, a position of the tapered portion 6' of the coil end 5' in the X-axis direction is also fixed by the first pressing jig 10'. That is, in a state where the detent portion 12 is fitted to the chamfer 7 of the tapered portion 6 and the detent portion 12' is fitted to the chamfer 7' of the tapered portion 6', the detent portions of the pair of detent portions 12, 12' are moved so as to approach each other along the circumferential direction, so that the positions of the pair of tapered portions 6, 6' in the circumferential direction are fixed.

At this time, when the detent portions of the pair of detent portions 12, 12' are moved so as to approach each other along the circumferential direction, respective chamfers 7, 7' of the pair of tapered portions 6, 6' are fitted to respective fitting surfaces 14, 14', so that the positions of the pair of tapered portions 6, 6' in the circumferential direction are fixed. Hereby, the pair of tapered portions 6, 6' is sandwiched by the pair of first pressing jigs 10, 10' in the circumferential direction of the stator core 2 so as to be fitted thereto, and thus, the positions of the pair of tapered portions 6, 6' in the circumferential direction of the stator core 2 are fixed.

As illustrated in FIGS. 10 to 13, the position of the segment coil 4 variously changes. When a bending angle of the segment coil 4 is small, the coil end 5 projects upward (Z-axis direction) relative to the reference position P (see FIG. 10). In this case, when the first pressing jig 10 moves down along the Z-axis so as to press the tapered portion 6 downward, the tapered portion 6 is placed at the reference position P. In the meantime, when the bending angle of the segment coil 4 is large, the coil end 5 is positioned downward (−Z-axis direction) relative to the reference position P (see FIG. 11). rating generally the first pressing jigs in a generally perpendicular direction with respect to portion 6 upward by the detent portion 12. That is, the chamfer 7 of the tapered portion 6 slides up over the fitting surface 14 of the detent portion 12 so that the detent portion 12 is fitted to the tapered portion 6. By this process, the tapered portion 6 is placed at the reference position P.

Further, when a curve R of the segment coil 4 is too large (see FIG. 12), the position of the coil end 5 is placed to deviate in the X-axis direction. In this case, the first pressing jig 10 moves along the X-axis so as to move the tapered portion 6 in the −X-direction by the detent portion 12. By this process, a force to compress the tapered portion 6 in the axial direction of the segment coil 4 is applied due to the detent portion 12 and the flat portion 11, so that the curve R is reduced and the tapered portion 6 is placed at a correct position (see FIG. 13).

Next will be described positioning of the coil end 5 with respect to the radial direction of the stator core 2. Both sides of the pair of coil ends 5, 5' are sandwiched by the pair of second pressing jigs 20, 20' along the Y-axis direction (see FIG. 7). Distal ends of the pair of second pressing jigs 20, 20' are provided with protruding portions 22, 22' configured to sandwich the pair of tapered portions 6, 6' from both sides. The protruding portions 22, 22' are formed so as to project in the −Z-direction to enter spaces Q, Q' between a plurality of pairs of tapered portions 6, 6' adjacent to each other in the radial direction of the stator core 2. That is, the pair of coil ends 5, 5' is sandwiched by the pair of second pressing jigs 20, 20' from an inner side and an outer side in the radial direction of the stator core 2. By this process, a movement of the pair of coil ends 5, 5' in the Y-axis direction is restricted. The positions of the pair of tapered portions 6 in the radial direction of the stator core 2 are fixed to their correct positions.

Due to the pair of first pressing jigs 10, 10' and the pair of second pressing jigs 20, 20', the pair of tapered portions 6, 6' is fixed in three axial directions of the axial direction, the circumferential direction, and the radial direction of the stator core 2, and are placed at their correct positions. At this time, the pair of tapered portions 6, 6' make contact with each other, so that a contacting portion B is formed. The contacting portion B can be observed through the penetration grooves 13, 13' from an upper side in the Z-axis. After that, the contacting portion B is welded with a laser beam 31 by a laser welder 30 from the upper side in the Z-axis direction through the penetration grooves 13, 13'. When the laser beam is applied through the penetration grooves 13, 13', it is possible to weld the contacting portion B without affecting other parts except for the contacting portion B as a welding target.

As described above, according to the joining method for the coil ends 5 of the segment coils 4, in a case where the coil end 5 has the tapered portion 6 formed in a tapered shape, it is possible to accurately position the pair of tapered portions 6, 6' at their correct positions. Further, it is possible to perform laser beam welding on the pair of tapered portions 6, 6' through the penetration grooves 13, 13' provided in the pair of first pressing jigs 10, 10'. With the use of the penetration grooves 13, 13', it is possible to prevent other parts except for the welding target from being affected. According to the joining method for the coil ends 5, it is possible to reduce an overall length of the segment coils 4, thereby making it possible to downsize a motor to be manufactured from the stator coil. Further, by reducing the overall length of the segment coils 4, it is possible to reduce a manufacturing cost of the motor.

The above embodiment is not intended to be limiting, and various modifications can be made to it.

Figure 14:
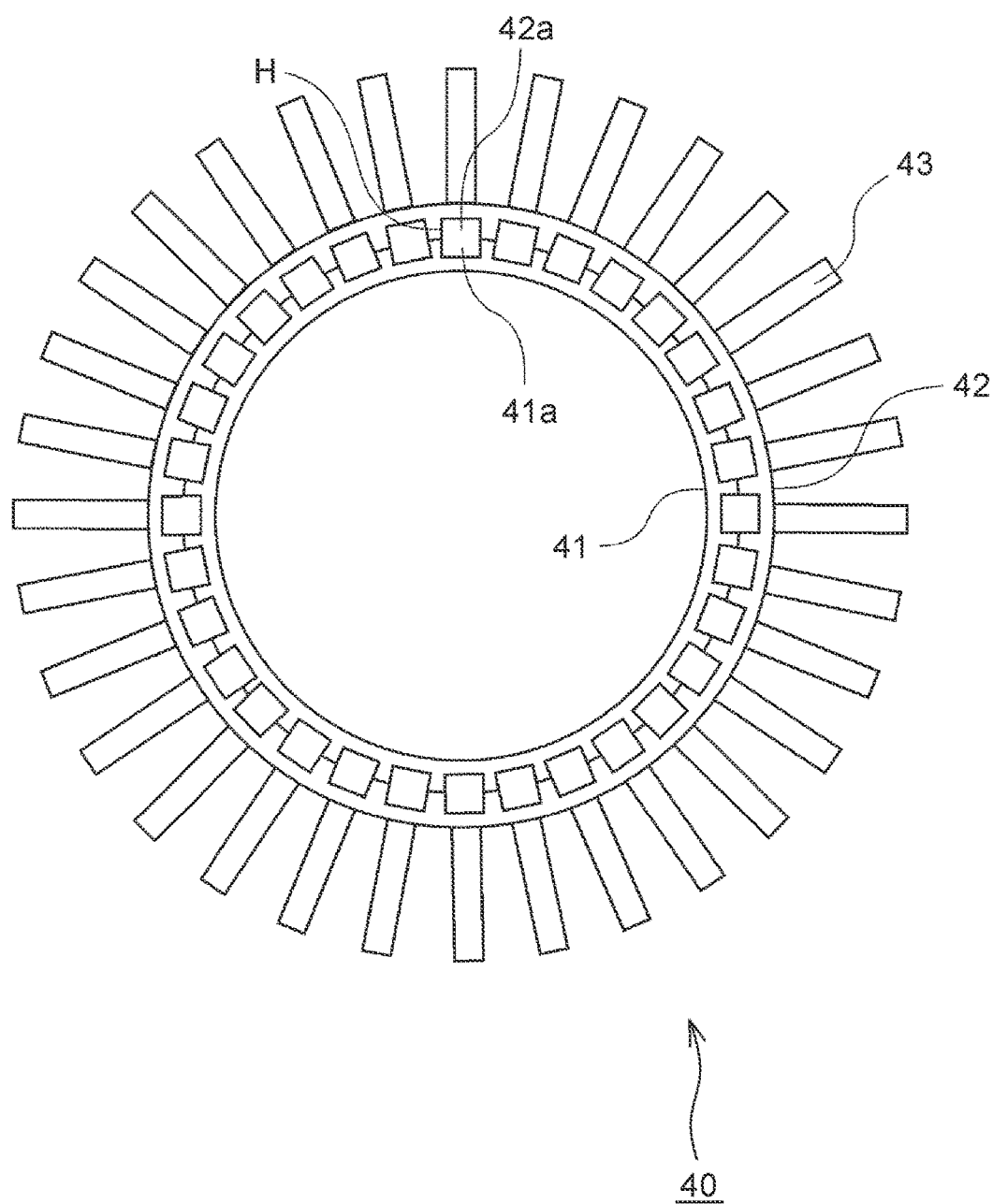
FIG. 14 is a view illustrating a clamping device as a modification of the coil end joining apparatus.

As illustrated in FIG. 14, a clamping device 40 may be provided such that a plurality of pairs of first pressing jigs 10, 10' and a plurality of pairs of second pressing jigs 20, 20' are arranged so as to extend in the circumferential direction of the stator core 2. In the following description, the same configuration as the one described in the above description uses the same name and reference sign and a similar configuration to the above uses the same name, so redundant descriptions thereof are omitted.

The clamping device 40 includes a toric inner-side clamp 41, a toric outer-side clamp 42 placed on an outer peripheral side relative to the inner-side clamp 41, and a plurality of second pressing jigs 43 placed radially on the outer peripheral side relative to the outer-side clamp 42. A plurality of penetration grooves 41a, 42a is formed in the inner-side clamp 41 and the outer-side clamp 42, respectively. A through-hole H is formed by a pair of penetration grooves 41a, 42a. The inner-side clamp 41 and the outer-side clamp 42 are rotatable relative to each other concentrically.

Figure 15:
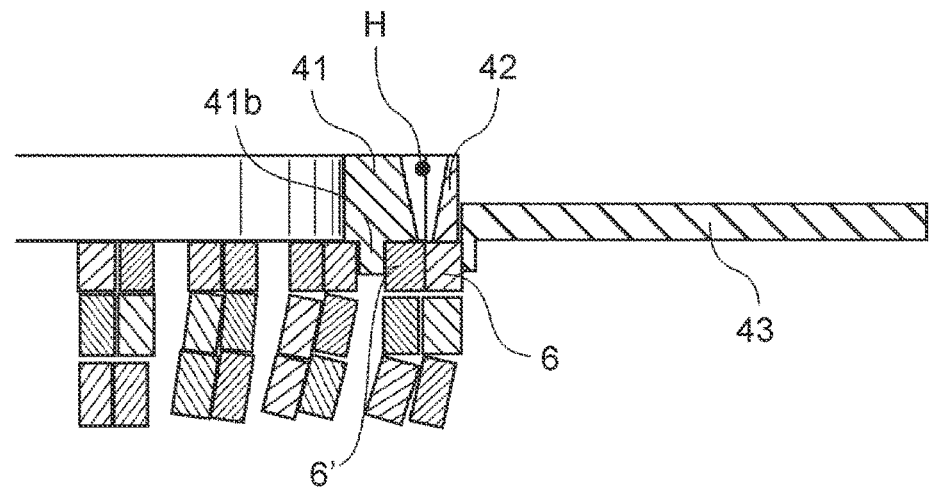
FIG. 15 is a sectional view illustrating a configuration of the clamping device.

As illustrated in FIG. 15, the second pressing jig 43 is placed on a side surface of the outer-side clamp 42 so as to be slidable in the Y-axis direction. A protruding portion 41b opposed to the second pressing jig 43 is provided on a bottom face of the inner-side clamp 41. A pair of tapered portions 6, 6' is sandwiched by the second pressing jig 43 and the protruding portion 41b along the Y-axis direction.

Figure 16:
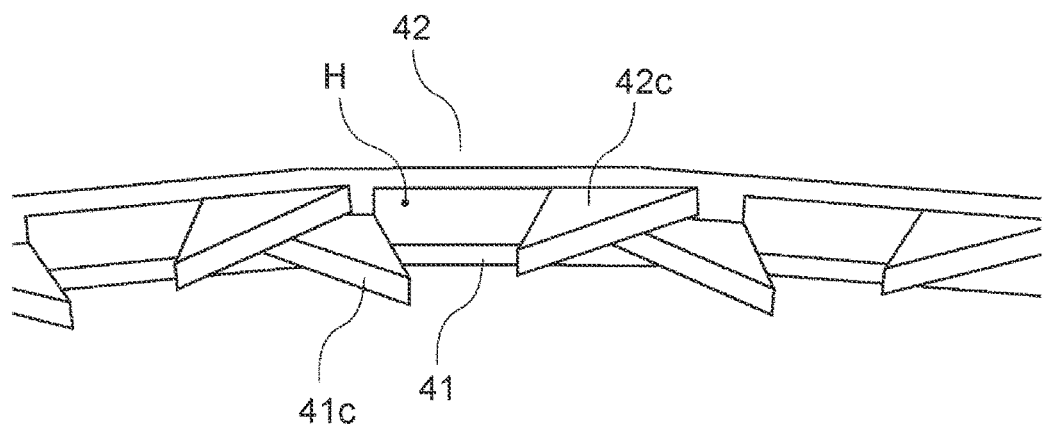
FIG. 16 is a perspective view illustrating a detent portion of the clamping device.

As illustrated in FIG. 16, the pair of tapered portions 6, 6' is sandwiched in the circumferential direction of the stator core 2 by a detent portion 41c formed on the bottom face of the inner-side clamp 41 and a detent portion 42c formed on a bottom face of the outer-side clamp 42. A plurality of pairs of tapered portions 6, 6' extended in the circumferential direction of the stator core 2 is positioned in the circumferential direction of the stator core 2 by the relative rotation between the inner-side clamp 41 and the outer-side clamp 42. The plurality of pairs of tapered portions 6, 6' is positioned in the axial direction of the stator core 2 by the inner-side clamp 41 and the outer-side clamp 42. After that, contacting portions B of the plurality of pairs of tapered portions 6, 6' are subjected to laser welding through the through-holes H.

Further another plurality of pairs of tapered portions 6, 6' extended in the circumferential direction of the stator core 2 are positioned by a clamping device 40 having a different outside diameter, and then subjected to laser welding.

What is claimed is:

1. A joining method for coil ends of segment coils for a stator, the joining method comprising:
    assembling segment coils formed in a predetermined shape into slots of a stator core sequentially from an inner side toward an outer side in a radial direction of the stator core;
    tilting coil ends of a pair of the segment coils adjacent to each other in the radial direction in the stator core so that the coil ends are tilted toward mutually opposite directions in a circumferential direction of the stator core, the coil ends each having a tapered portion having a distal end with a tapered shape and having a chamfer facing toward the stator core;
    pressing a pair of the tapered portions adjacent to each other in the radial direction in a state where the coil ends are tilted, such that a pair of first pressing jigs provided with a pair of detent portions is brought closer to the coil ends along an axial direction of the stator core, the pair of detent portions being fitted to the pair of tapered portions;
    fixing axial positions of the pair of the tapered portions such that a first one of the pair of detent portions is fitted to the chamfer of a first one of the pair of the tapered portions and a second one of the pair of detent portions is fitted to the chamfer of a second one of the pair of the tapered portions;
    fixing radial positions of the pair of the tapered portions such that the pair of the tapered portions is sandwiched by a pair of second pressing jigs from the inner side and the outer side in the radial direction so that the pair of tapered portions make contact with each other; and
    welding a contacting portion where the tapered portions of the pair of the tapered portions make contact with each other.

2. The joining method according to claim 1, further comprising:
    fixing circumferential positions of the pair of the tapered portions such that, in a state where the first one of the pair of detent portions is fitted to the chamfer of the first one of the pair of the tapered portions and the second one of the pair of detent portions is fitted to the chamfer of the second one of the pair of the tapered portions, the pair of detent portions are moved so as to approach each other along the circumferential direction.

3. The joining method according to claim 1, wherein:
the detent portions each have a fitting surface formed along the circumferential direction and inclined to a direction approaching the stator core in the axial direction; and
when the detent portions of the pair of detent portions are moved so as to approach each other along the circumferential direction, the circumferential positions of the pair of the tapered portions are fixed such that the respective chamfers of the pair of the tapered portions are fitted to the respective fitting surfaces.

4. The joining method according to claim 1, wherein:
each of the first pressing jigs has a penetration groove that penetrates the first pressing jigs along the axial direction at a position corresponding to a position of the contacting portion along the axial direction; and
laser welding is performed on the contacting portion through the penetration groove.

* * * * *